United States Patent

[11] 3,630,550

| [72] | Inventor | Anthony R. Zine, Jr.<br>Corning, N.Y. |
|---|---|---|
| [21] | Appl. No. | 13,006 |
| [22] | Filed | Feb. 20, 1970 |
| [45] | Patented | Dec. 28, 1971 |
| [73] | Assignee | Corning Glass Works<br>Corning, N.Y. |

[54] PIPE COUPLING
11 Claims, 5 Drawing Figs.

[52] U.S. Cl..................................................... 285/235,
285/373, 285/423, 285/DIG. 12, 285/DIG. 16
[51] Int. Cl........................................................ F16l 21/00
[50] Field of Search............................................ 285/235,
236, 383, 420, 365, 366, 367, DIG. 12, DIG. 16,
233, 373, 419, 423

[56] References Cited
UNITED STATES PATENTS

| 3,186,744 | 1/1965 | Smith et al..................... | 285/383 X |
| 3,387,839 | 6/1968 | Miller et al. .................. | 285/DIG. 16 |
| 3,439,945 | 4/1969 | Chambers et al............. | 285/373 |
| 3,419,291 | 12/1968 | Tomb et al..................... | 285/236 X |

FOREIGN PATENTS

| 5,240 | 1915 | Great Britain................ | 285/419 |

Primary Examiner—Dave W. Arola
Attorneys—Clarence R. Patty, Jr. and Ernst H. Ruf ABSTRACT: A coupling for joining a cylindrical and a beaded pipe end portion, the coupling having a resilient liner surrounding the pipe end portions with a first force development member surrounding a first section of the liner and urging the liner first section into sealing relationship with the beaded pipe end portion and a second force development member, adjacent and attached to said first force development member, surrounding a second section of the liner and urging the liner second section into gripping and sealing relationship with a peripheral surface band area of the cylindrical pipe end portion.

PATENTED DEC 28 1971 3,630,550

INVENTOR.
Anthony R. Zine, Jr.
BY
Ernst H. Ruf
ATTORNEY

Anthony R. Zine, Jr.
ATTORNEY

PIPE COUPLING

BACKGROUND OF THE INVENTION

The field to which this invention pertains is that of pipe couplings in fluid-handling systems and more particularly, couplings having utility in joining an unbeaded cylindrical glass pipe end portion to a beaded glass pipe end portion.

The patent art is replete with pipe couplings that are used for joining a plain ended glass pipe to a beaded glass pipe. Some of these patents, such as U.S. Pat. No. 3,419,291, teach the utilization of a beadlike adapter member that is held around the end of an unbeaded cylindrical section of a glass pipe by means of a metal band bonded to the outer surface of the pipe and interlocked with the adapter member. Thus, in effect an artificial bead is produced and a second metal band is then used to maintain a flexible gasket around the adapter member and the conventional beaded pipe to achieve an essentially normal bead-to-bead coupling. While this coupling is quite successfully used, it is however somewhat time consuming to assemble due to the number of parts involved and the bonding process utilized.

The coupling shown in U.S. Pat. No. 3,376,055 to Donroe, which is also used for joining a plain ended glass pipe to a beaded glass pipe, utilizes a thin Teflon sleeve intimately surrounded by a sleeve of rubber, with the rubber sleeve being in turn surrounded by a split sheet-metal-clamping collar that is tightenable by means of a conventional nut and bolt assembly. While this design is workable it should be noted that on the plain ended glass pipe the coupling has to perform both the gripping and sealing functions. The clamping collar must be drawn up very tight otherwise there is a tendency for the plain ended pipe to "walk out" of the coupling. The use of only one outer collar or force development member sometimes produces unbalanced forces on the pipe ends especially when the dimensions of the two pipe end portions are near the opposite ends of their dimensional tolerance limits. If, for example, the beaded end is near its maximum size and the plain end is near its minimum size, unbalanced forces are exerted on the beaded end since the coupling must be tightened to the extent to provide both sealing and gripping of the plain ended pipe.

Another problem in the prior art, as shown by both Donroe and in U.S. Pat. No. 3,232,647 to Kirchoff is that the sharp edge of the plain ended glass pipe directly abuts the Teflon sleeve. If vibrations take place in the coupling during use, the sharp outer edge may abrade or cut into the Teflon sleeve and thus permit leakage of corrosive fluid to the rubber sleeve which has less chemical resistance. In addition, especially in the structure of the Donroe patent, cutting of the Teflon sleeve can occur during the insertion of the plain ended glass pipe into the coupling.

SUMMARY OF THE INVENTION

This invention solves the previously mentioned problems by utilizing a whole new concept in the design and structure of pipe couplings used for joining plain and beaded glass pipe ends. It allows a softer seal approach (lower stress) which will adequately maintain the system's corrosion resistance while at the same time providing positive gripping of the plain ended glass pipe. These seemingly diverse objectives are met by the use of two similar collars or force-development members, one for each of the two pipe ends. The twin force-development members are attached to each other by means of multiple strips of a composite adhesive medium that is unidirectional in strength in the axial direction and therefore strongly resistant to axial pulls (thereby resisting axial separation) while allowing a relative amount of independent circumferential movement; i.e., allowing independent opening and closing thereof. Thus, regardless of the dimensional tolerance variations between the two pipe ends, low stress soft seals can be made on both pipe ends.

In summary, this invention relates to a pipe coupling for connecting a first pipe portion, having a constant outer diameter and a flat end surface, to an end portion of a second pipe. The coupling includes an annular resilient liner which surrounds the pipe end portions and has an inwardly projecting rib portion extending between the pipe ends; a first force development member which surrounds a first section of the liner and urges it into a sealing relationship with the second pipe end portion; and a second force development member adjacent and attached to the first force-development member, which surrounds a second section of the liner and urges it into gripping and sealing relationship with a peripheral surface band area of the first pipe end portion. In addition, substantially the entire inner peripheral surface of the liner second section is provided with a nontacky, water tolerant, adhesive medium capable of producing a pressure-activated bond between it and the first pipe end portion without the use of heat or solvents. Furthermore, a generally annular barrier means, such as Teflon, is interposed between the liner and the pipe end portions for at least the length of the axial extent of the liner first section. The coupling further includes a bead separator which is interposed between the first pipe end portion and the inwardly projecting rib portion of the liner to protect the barrier means from the sharp outer edge of this pipe end. In order to further protect the barrier means from being cut during the assembly of the coupling the liner second portion is provided with an inwardly projecting expander ring in the vicinity of its sealing ridge.

BRIEF DRAWING DESCRIPTION

DETAILED DESCRIPTION

Figure 1:
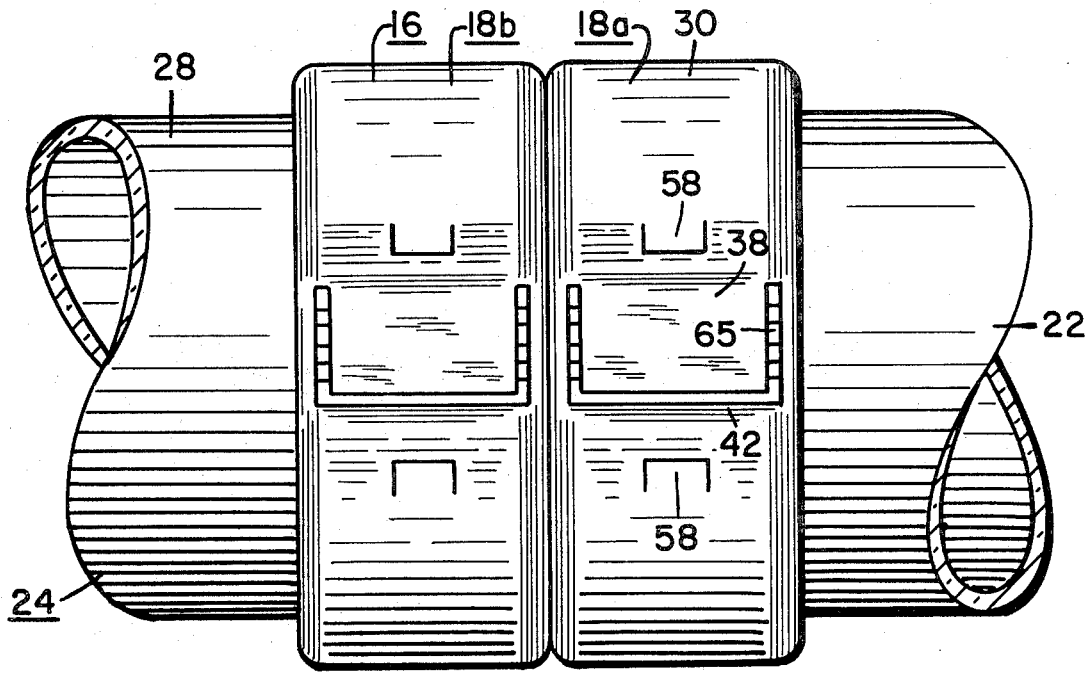
FIG. 1 is a side elevational view of two end portions of glass pipe joined by a coupling according to the invention.
Figure 2:
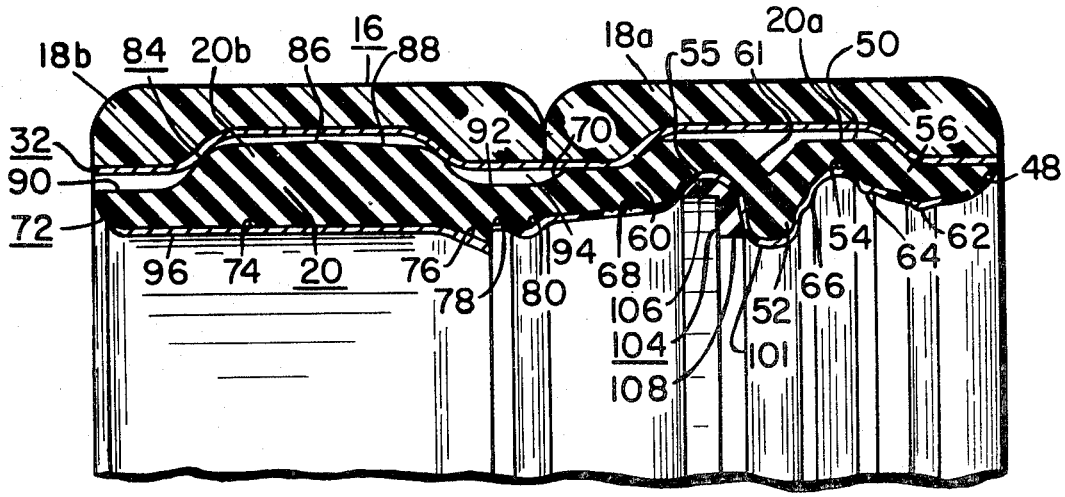
FIG. 2 is an enlarged axial sectional view through the coupling of FIG. 1 prior to the tightening thereof.
Figure 3:
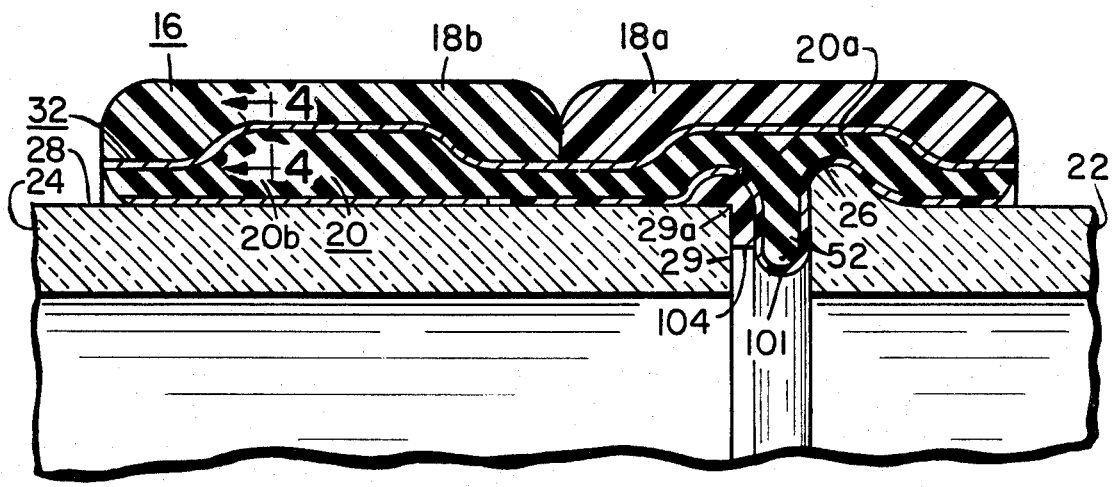
FIG. 3 is a view similar to that of FIG. 2 showing the coupling subsequent to tightening.

Referring now to the drawings in detail, FIGS. 1, 2 and 3 show the coupling 16 of this invention which is basically comprised of similar force-development members 18a, 18b and annular resilient liner 20.

As best seen in FIGS. 1 and 3, coupling 16 is used in joining pipe end portions 22 and 24. Pipe end portion 22 is provided with a bead 26 at its end while pipe portion 24 has a plain cylindrical end having outer peripheral surface 28, flat annular end surface 29 and their intersecting edge 29a.

Each of the force development members 18a, 18b comprises a generally circular one piece band 30 having end sections 38 and 42 capable of overlapping. End sections 38 and 42 have complementary locking means 65 capable of stepped interlocking engagement over a predetermined distance upon application of an external force. Such force may be supplied by the use of a pair of conventional pliers whose jaws are partially inserted into grip ridges 58 on band 30 thereby force band sections 38 and 42 to a locked position, as best shown in FIG. 1. Force development members of the type depicted by numerals 18a, 18b are thoroughly described in copending U.S. application No. 12,940 filed Feb. 20, 1970 and also assigned to the assignee of this invention. Obviously, other types of force-development members may be utilized. Open-ended metal collars, drawn together by nut and bolt assemblies, such as those disclosed in U.S. Pat. No. 3,419,291 to Tomb et al., can also be employed, for example.

Force development members 18a, 18b, which are adjacent to one another, are attached to one another by means of multiple strips of a composite adhesive medium 32. Strips of medium 32, which adheres to the inner peripheral surfaces of members 18a, 18b, extend in an axial direction with respect to members 18a, 18b.

Figure 4:
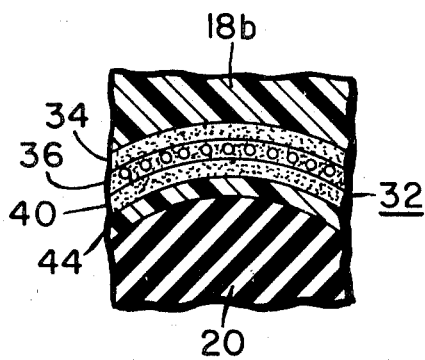
FIG. 4 is an enlarged sectional view, taken on line 4—4 of FIG. 3, illustrating the composite adhesive medium utilized in joining the force-developing members in this coupling.

Referring to FIG. 4, composite adhesive medium 32 comprises four discrete layers. Outer layer 34, next to the inner peripheral surfaces of members 18a, 18b, comprises a modified nitrile-base adhesive which is capable of being softened and rendered adhesive by the action of heat and the action of a solvent such as acetone or methyl ethyl ketone. Layer 36, next to layer 34, comprises a layer of bidirectional fiber glass cloth, with the majority of said fibers being oriented in an axial direction with respect to members 18a, 18b. Layer 36 is therefore unidirectional in strength in the axial direction and strongly resistant to axial pulls while allowing a relative amount of independent circumferential movement of members 18a, 18b, i.e., allowing independent opening and closing thereof. Layer 40, next to layer 36, comprises a thermoset adhesive. Layer 44, next to layer 40, comprises a layer of acetate film.

The four layers 34, 36, 40 and 44 of composite adhesive medium 32 are first united and then attached to the inner peripheral surfaces of members 18a, 18b in the following manner: Layer 36, comprising a layer of bidirectional fiber glass cloth about 3 mils thick, such as No. 6497 Skrim obtained from J. P. Stevens Inc., is placed upon layer 44 which comprises a layer of acetate film about 1 mil thick. Then, layer 40, comprising a coating about 1 mil thick of a thermoset adhesive, such as Mystik thermoset adhesive No. 819, is applied over layer 36. During a curing cycle of about 1 minute at approx. 250° F., layer 40 seeps through layer 36 and securely bonds layer 36 to layer 44. Thereupon, layer 34, comprising a layer about 1 mil thick of a nitrile base adhesive, such as No. A1169B available from B. F. Goodrich, is applied over layer 36 and dried for about 1 minute at approx. 250° F.

With the assembly of medium 32 now complete, it is used to attach force development members 18a, 18b to one another as follows: Members 18a, 18b are preheated to about 80° C. and are then placed in a suitable assembly fixture. Several strips of adhesive medium 32, that have been solvent activated, by use of, for example, acetone or methyl ethyl ketone applied to layer 34, are positioned on the inner peripheral surfaces of adjoining members 18a a, 18b. Pressure is maintained on the strips for 15-20 seconds and post curing of the assembly at about 125° C. for approx. 1 hr. securely bonds medium 32 to members 18a, 18b. After cooling, a lubricating coating such as white petroleum jelly is applied to the inner peripheral surfaces of members 18a, 18b, to permit easy insertion of annular resilient liner 20 and allow ultimate equal distribution of forces by force developing members 18a, 18b.

As best seen in FIG. 3, which shows coupling 16 subsequent to the tightening of force-development members 18a, 18b, annular resilient liner 20 is shown in its compressed state, interposed between force-development members 18a, 18b and pipe end portions 22, 24. FIG. 2 shows liner 20 in its assembled but uncompressed state. For ease of understanding, liner 20 may be thought of as consisting of two main sections, namely, first section 20a which is surrounded by first force-development member 18a and second section 20b which is surrounded by second force-development member 18b, with the intersection between said liner first and second sections 20a, 20b, respectively, being in a plane passing between adjacent members 18a, 18b, parallel to the end surfaces thereof or normal to their longitudinal axes.

Liner first section 20a in addition to inner surface 48 and outer surface 50, also has inwardly extending rib portion 52, recessed portions 54, 55, outer wing portion 56 and inner wing portion 60. Outer surface 50 has a V-shaped center recess 61 and inner surface 48 has raised sealing or pressure ridges 62 on the apex of outer wing portion 56. Raised sealing or pressure-intensifying ridges 64 and 66 are located adjacent opposite ends of recessed portion 54. In the installed and compressed condition, as shown in FIG. 3, liner first section outer surface 50 generally assumes the contour of the inner peripheral surface of member 18a and inner surface 48 generally conforms to the contours of pipe end portion 22. Depending on the tolerance of pipe end portion 22, the raised sealing ridges, due to the resiliency of liner 20, may either partially or fully blend into a contour complementary to that of pipe end portion 22. Raised sealing ridges 62, and 64, 66 effectively act as individual seals on the outer surface of pipe end portion 22 and beaded portion 26, respectively. Inner surface 48 in the area of inner wing portion 60 has outwardly tapering inner surface portion 68. Outer surface 50 in the area of inner wing portion 60 has inwardly tapering surface portion 70.

Figure 5:
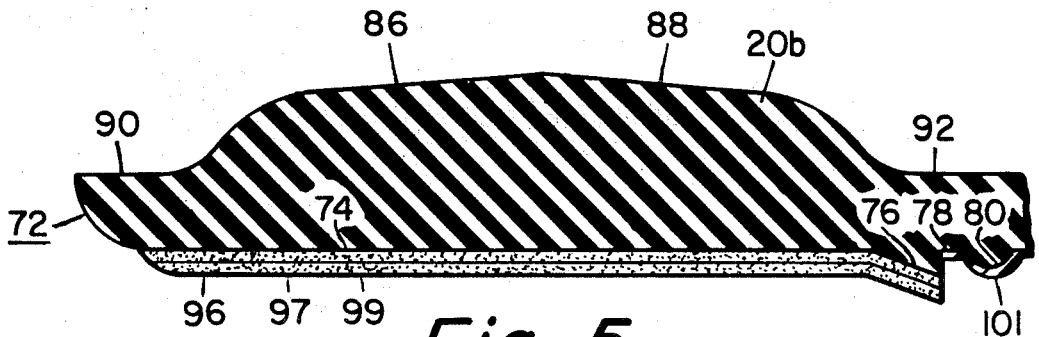
FIG. 5 is an enlarged sectional view of the second section of the annular resilient liner utilized in this coupling.

Liner second section 20b, best shown in FIGS. 2 and 5, which is surrounded by second force-development member 18b, has an inner surface 72 comprised of flat gripping surface 74, inwardly projecting expander ring 76, recess 78 and inwardly projecting raised sealing ridge 80. Outer surface 84 is comprised of tapered surfaces 86, 88 which together define a raised crown area, outer wing portion 90 and inner wing portion 92. Surface portion 92 adjoins liner first section surface portion 70 and together with the inner peripheral surfaces of members 18a, 18b, in the vicinity of the intersection of members 18a, 18b, define annular recess 94. Liner first section surface portion 68 adjoins liner second section raised sealing ridge 80 in the vicinity of the intersection of members 18a, 18b.

Flat gripping surface portion 74, which extends for most of the axial length of liner second section inner surface 72, and inwardly projecting expander ring portion 76 are provided with a nontacky, water tolerant, adhesive medium 96. Medium 96 is capable of producing a pressure-activated (not pressure sensitive) bond between portions 74, 76 and a portion outer peripheral surface 28 of pipe end portion 24.

Referring to FIG. 5, composite adhesive medium 96 comprises two discrete layers 97, 99. Primer coat 97 comprises a neoprene-base adhesive while top coat 99 is comprised of a modified nitrile-base adhesive.

Adhesive medium 96 is applied to surface portions 74, 76 in the following manner: Surfaces 74, 76 are washed to remove any remaining mold release compound, thereupon a uniform layer of primer coat 97 (about 1 mil thick when dry) of a neoprene-base adhesive, such as Garlock No. 36301 neoprene cement, is applied thereon, and the solvent therein is allowed to air flash. Top coat 99 (about 0.5 mil thick when dry) of a nitrile base adhesive such as a solution of 1 part (by weight) of B. F. Goodrich No. A1169B adhesive and 1.5 parts (by weight) of a solvent such as acetone, is then applied over primer coat 97. After the solvent in top coat 99 has been allowed to air flash, liner 20 is oven-cured for about 1 hour at approx. 100° C. and then allowed to cool.

Annular resilient liner 20 is comprised preferably of a chemically resistant elastomeric material such as a rubber-base compound like neoprene, an EPDM or similar polymer having a 40 to 60 Shore A hardness. These materials will support a given stress with only negligible long-time compression "set." This feature makes them desirable for use in the subject coupling, which generally receives no further physical adjustment after complete closure of members 18a, 18b.

In addition to adhesive medium 96, which covers liner inner surface portions 74 and 76, the remaining liner inner surface portions (namely recess 78, and sealing ridge 80 of liner second section 20b, as well as the entire inner surface 50 of liner first section 20a) is provided with an annular barrier or gasket means 101. Thus, barrier means 101 covers essentially the entire axial extent of liner first section 20a as well as sealing ridge 80 and recess 78 of liner second section 20b.

Annular barrier means 101 is preferably comprised of fluorinated ethylene-propylene or polytetrafluoroethylene synthetic resin which is sold by the E. I. duPont de Nemours Co. under the trademark "Teflon." Barrier means 101 must be thin enough to react in the same manner as liner 20, i.e., it must yield from low stress to conform to the pipe surfaces. Barrier means 101 is preferably bonded to liner 20 in order to force it to conform to the pipe surface without buckling.

In order to protect barrier means 101 in the area of inwardly extending rib portion 52 from the generally sharp edge 29a (FIG. 3) of pipe end portion 24, a bead separator or skive protector ring 104 is interposed between rib portion 52, liner first section inner recessed portion 55 and pipe end portions 24. Bead separator 104, preferably made of high-density polyethylene, is comprised of horizontal and vertical lip portions 106, 108 respectively, which effectively cradle edge 29a therebetween, with portion 106 abutting an annular portion of pipe outer peripheral surface 28 and portion 108 abutting flat annular end surface 29.

Assembly of pipe end portions 22 and 24 by means of coupling 16 is affected as follows:

With force-development members 18a, 18b, in open unlocked positions (i.e., locking means 65 disengaged) liner 20, including bead separator 104, is inserted therein so that members 18a, 18b surround liner sections 20a, 20b respectively, thereby completing the assembly of coupling 16. With coupling 16 still in the open position, plain cylindrical pipe end portion 24 is carefully axially inserted into the interior of liner 20 starting from the open end of section 20b, with the nontackiness of adhesive medium 96 allowing easy insertion thereof. When pipe edge 29a encounters inwardly projecting expander ring portion 76, further axial inward movement of edge 29a causes a certain amount of radial expansion (depending upon the tolerance of pipe end portion 24) of inner wing portion 92 into annular recess 94. As a consequence of said radial expansion, raised sealing ridge 80 is also at least partially deflected into recess 94. It is the function of expander ring portion 76 to remove sealing ridge 80 from the path of edge 29a to prevent damage to ridge 80 and its barrier means 101. Recess 78 not only separates expander ring portion 76 and sealing ridge 80 but also serves as a convenient place for the termination of barrier means 101. Expander ring portion 76 thus guides edge 29a over sealing ridge 80 without cutting barrier means 101.

Axial inward movement of pipe end portion 24 is then continued until its annular end surface 29 abuts bead separator vertical lip portion 108, thereby arresting further axial movement. As previously noted, edge 29a is cradled between bead separator lip portions 106, 108. It should further be noted that the outward tapering of inner surface portion 68 serves to keep edge 29a from cutting its surface barrier means 101 and compensates for varying diameters between pipe end portions 22, 24, so as to allow sealing of both pipe end portions 22 and 24.

Upon the full insertion of pipe end portion 24, as described, second force development member 18b is then closed by the application of an outside generally circumferential force upon grip ridges 58, thereby effectively overlapping band end sections 38, 42 and intermeshing locking means 65. Upon the closing of member 18b, the crown effect produced by surfaces 86, 88 effectively expels, both axially outwardly and inwardly, any fluids (such as for example air or water) between pipe end portion 24 and liner second section 20b, thereby allowing more intimate surface contact therebetween. As member 18b is closed, adhesive medium 96 grips pipe end outer peripheral surface 28 and in time bonds itself tenaciously to surface 28 without the use of either heat solvents. The bond produced by adhesive means 96 does not deteriorate with age, but rather increases the affinity for rubber and glass as time passes. The nontackiness of adhesive medium 96 allows a certain amount of relative movement between pipe end portion 24 and liner 20 during the installation of pipe end portion 24, and during the tightening of member 18b. This movement is very necessary for obtaining good surface contact between pipe end outer peripheral surface 28 and adhesive means 96. Thus, it is the function of adhesive means 96 to securely grip and attach itself to pipe end section 24. Sealing of pipe end peripheral surface 28 is performed by raised sealing ridge 80, which upon the closing of member 18b, is forced into sealing relationship therewith. This completes the assembly and sealing of pipe end portion 24 with coupling 16. It should be noted however, even though a section of pipe end portion 24 extends into liner first section 20a (and force-development member 18a), all of the gripping and sealing of pipe end portion 24 is performed only by second force-development member 18b in conjunction with liner second section 20b.

The assembly of pipe end portion 22 into coupling 16 consists of inserting pipe end portion 22 into the interior of liner first portion 20a until bead 26 is seated in liner recessed outer portion 54 and abuts inwardly projecting rib portion 52. First force-development member 18a is then closed in the same manner as previously discussed with reference to member 18b. The circumferential closing force also exhibits a radial force component directly against bead 26 and the outer surface portion of pipe end portion 22, to urge liner 20a and barrier means 101 into sealing relationship therewith. Thus first force-development member 18a, in conjunction with liner first section 20a, performs the gripping and sealing of pipe end portion 22.

Therefore in summary, it may be said that the primary functions of second force-development member 18b, in conjunction with liner second section 20b, are to grip and firmly hold pipe end portion 24, as well as provide the sealing force, via sealing ridge 80, on pipe end portion 24. Furthermore, the primary functions of first force development member 18a, in conjunction with liner first section 20a, are to both seal and grip pipe end portions 22.

While the subject invention has been described mainly with reference to a mechanical coupling for coupling glass pipes to glass pipes or glass pipes to pipes of other materials compatible for transporting fluids, such as for example some metals or plastics, it should be noted that with suitable modifications it can be adapted to almost any type of piping systems in addition to glass drain lines.

While this invention has been described in connection with possible forms or embodiments thereof, it is to be understood that changes or modifications may be resorted to without departing from the spirit of the invention or scope of the claims which follow.

I claim:

1. A coupling connecting a cylindrical pipe end portion to the beaded end portion of a second pipe in axial alignment, said coupling comprising:
   a. an annular resilient liner, including first and second sections, surrounding said pipe end portions, said liner first section including an inwardly projecting rib portion extending between said pipe ends;
   b. a first force development member, including a flexible generally cylindrical one piece band, surrounding said liner first section and urging said liner first section into sealing relationship with said beaded pipe end portion; and
   c. a second force development member, including a flexible, generally cylindrical one piece band, surrounding said liner second section and urging said liner second section into gripping and sealing relationship with a peripheral surface band area of said cylindrical pipe end portion in the vicinity of the end thereof, and means holding said first and second force development members in said urging position, said force development members being axially adjacent and attached to each other by means of multiple strips of a composite adhesive medium adhered to the inner peripheral surfaces of said bands and extending in an axial direction with respect to said force developing members.

2. The coupling of claim 1 wherein said adhesive medium includes at least one lay of fibers with at least a portion of said fibers being oriented so as to have a component extending in said axial direction, thereby resisting elongation of said adhesive medium in said axial direction while allowing a limited amount of independent circumferential movement of said force development members.

3. The coupling of claim 1 including a nontacky, water tolerant, adhesive means for producing a pressure-activated bond between at least a part of said liner second section and said cylindrical pipe end section, the nontackiness of said adhesive means allowing easy insertion of said cylindrical pipe end portion during assembly of said coupling, said adhesive means further, upon the urging of said second force development member, having the ability to grip the peripheral surface of said cylindrical pipe end portion and in time bond itself to said peripheral surface without the use of heat or solvents.

4. The coupling of claim 3 wherein said adhesive means is comprised of a composite structure having at least a primer coat of a neoprene-base adhesive and a top coat of a nitrile-base adhesive.

5. A coupling of claim 1 wherein a generally annular, one-component, barrier means is interposed between said annular liner and said pipe end portions for at least the length of the axial extent of said annular liner first section, said barrier means being sufficiently thin so to react in the same manner as said liner in yielding from low stress to conform to said pipe end portions.

6. The coupling of claim 5 with the addition of a bead separator interposed between said cylindrical pipe end portion and the inwardly projecting rib portion of said resilient liner.

7. The coupling of claim 6 wherein said bead separator comprises a skive protector ring having generally horizontal and vertical lip portions for cradling therebetween the intersection between the outer peripheral surface and end surface of said cylindrical pipe end portion, said skive protector ring preventing said intersection from damaging said barrier means in the area of said inwardly projecting rib portion.

8. The coupling of claim 1 wherein said annular resilient liner includes an inwardly projecting raised sealing ridge in the vicinity of the intersection of said liner first and second sections.

9. The coupling of claim 8 wherein said resilient liner second section includes an annular inwardly projecting expander ring portion, located in the vicinity of said raised sealing ridge, said expander ring portion causing radial expansion of said resilient liner in the vicinity of said raised sealing ridge during the assembly of said coupling, thereby preventing said cylindrical pipe end portion from damaging said sealing ridge.

10. The coupling of claim 9 wherein said annular resilient liner includes an external surface annular recess in the vicinity of the intersection of said liner first and second sections, said recess permitting the radial expansion of said resilient liner caused by said expander ring portion during the assembly of said coupling.

11. The coupling of claim 1 wherein said resilient liner second section includes a generally flat inner surface and an external surface raised crown area, said raised crown area being the first area of contact between said liner second section and said second force development member during the assembly of said coupling, thereby causing the initial contact between said liner inner surface and said cylindrical pipe end portion at an area opposite said raised crown area, thus helping to expel, both axially outwardly and inwardly, any fluids present between said liner inner surface and said cylindrical pipe end portion and thereupon allowing more uniform surface contact therebetween.

* * * * *